Patented June 16, 1931

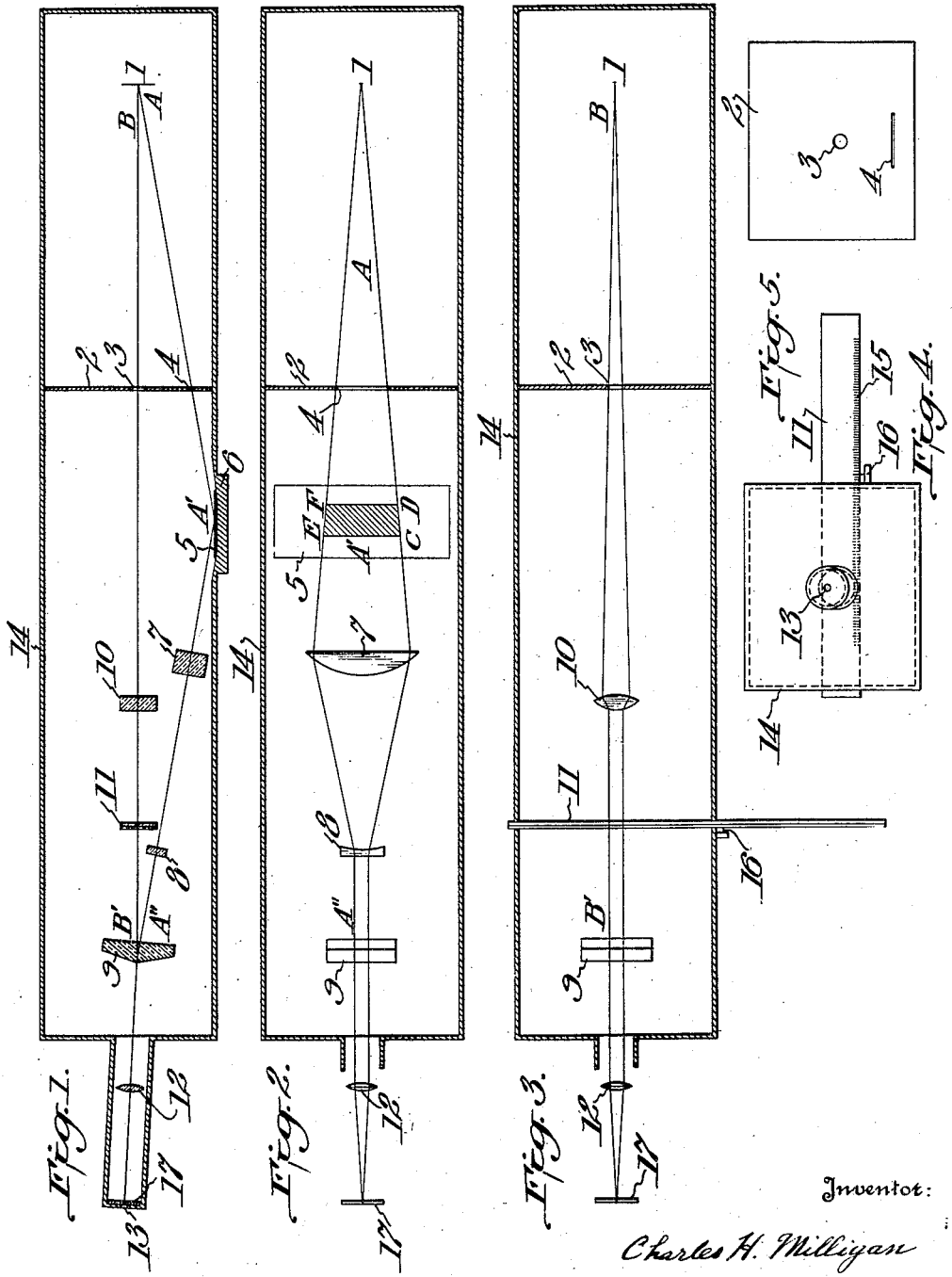

1,810,433

UNITED STATES PATENT OFFICE

CHARLES H. MILLIGAN, OF HAMILTON, OHIO, ASSIGNOR TO THE CHAMPION COATED PAPER COMPANY, OF HAMILTON, OHIO, A CORPORATION OF OHIO

OPTICAL APPARATUS FOR DETERMINING FINISH ON PAPER

Application filed July 5, 1929. Serial No. 376,149.

This invention relates to an optical apparatus for quantitatively determining finish on paper.

It is common practice to observe finish on paper by holding it in such a position that light falls upon it at a rather low angle of incidence and is directly reflected to the eye. This method, although in wide use, is only qualitative.

A quantitative method which has been proposed consists in allowing a beam of light to fall upon the paper at an angle of about $57\frac{1}{2}°$ and then measuring the degree of polarization of the light that exists in the reflected beam. This method does not determine finish directly and, although it is reasonably satisfactory for low finish papers, it is not reliable for high gloss papers such as highly finished coated papers.

One object of the present invention is to provide an optical apparatus for quantitatively determining the finish on paper directly.

Another object is to provide an apparatus which measures accurately the finish on paper over a wide range of finish.

Briefly, the invention resides in an apparatus comprising means for causing a beam of light to fall upon a limited length of the paper to be tested at a very low angle of incidence, and means for measuring the intensity of the illumination of the beam of light specularly reflected from the paper.

One embodiment of the apparatus forming the subject matter of this invention is illustrated in the accompanying drawings, in which:

Fig. 1 is a longitudinal sectional diagrammatic view of the apparatus showing the paths of the light to be measured and the comparison beam of light.

Fig. 2 is a diagrammatic plan view of the apparatus showing the path of the beam of light to be measured, Fig. 3 is a diagrammatic plan view of apparatus showing the path of the comparison beam of light, Fig. 4 is a front view of the apparatus, Fig. 5 is a front view of the screen.

1 is a source of light which may be for example a projection lamp. 2 is an opaque screen provided with two apertures, 3 and 4. Aperture 4 is a slot, the characteristics of which will be described later. The light passing through this slot falls upon the paper to be tested 5, which is held flat on a support 6. The path of the beam of light falling upon the paper is shown in the line AA' A". That portion of the light which is specularly reflected from the sample, as indicated by the line A' A", passes through the lenses 7 and 8 by which it is imaged on the prism 9. The comparison beam of light from the source 1 which passes through the circular aperture 3 in the screen 2, follows the course BB'. This beam passes through the lens 10 by which it is imaged on the prism 9. 11 is an optical wedge inserted in the path of the beam BB' between the lens 10 and the prism 9. This wedge comprises two plates of glass with a gelatine film between them. The gelatine film is relatively transparent at one end and regularly increases in opacity to the other end. The optical wedge 11 carries a graduated scale 15. By means of the pointer 16 mounted on the housing of the instrument, the position of the wedge is indicated on the graduated scale 15. 12 is a lens which receives the two beams of light AA' A" and BB' from the prism 9 and images them upon the eyepiece aperture 13 as two semi-circles with a common center line. 17 is a transparent colored screen preferably green, through which the field is viewed. The whole system is enclosed in an opaque housing 14, painted a dull black on the inside.

The operation of the instrument is as follows:—The sample of paper to be tested is held by the support 6 and the wedge 11 is manipulated until the intensity of the beam BB' matches that of the beam A' A" when viewed through the eyepiece. The position of the wedge 11 is then read upon the scale 15. The higher the finish on the paper, the further out the wedge is moved so as to cause the comparison beam of light to pass through the more transparent part of the gelatine film.

When light falls upon paper, part of it is reflected specularly, part is difusely reflected, and part is absorbed by the paper. Paper having a high finish is paper which reflects considerable light specularly. The difference in the amount of light specularly reflected from two papers of different finish is greater at lower angles of incidence than at higher angles. I have found that as the angle of incidence of the light decreases, the test as carried out with the above described apparatus becomes more and more sensitive as a measurement of finish, reaching a maximum sensitivity at about 8°. Thus at an angle of about 30° the instrument fails to adequately distinguish the finish between papers which to the unaided eye are considerably different. However, at an angle of incidence of 8 to 10°, the instrument easily shows differences which are not discernible to the unaided eye.

It is essential for the proper sensitivity of the instrument that the longitudinal dimension C—D of the image CDEF on the paper be as small as possible. This means that in view of the low angle of incident light used, the aperture 4 in the screen 5 must be as small as possible in the vertical dimension, and also that the source of light must not be too close to the aperture. An aperture of about .015 inch in the vertical dimension is about as small as can be employed, for apertures of a size smaller than this give rise to fringe effects. With the light source, screen and sample, in about the proportion indicated in Fig. 1, for example, an image about 3/8" long (dimension C—D) and 1" wide (dimension C—E) is produced on the sample. By introducing a suitable lens in front of the screen 2, or by using direct sunlight as the source of light, a somewhat larger aperture may be employed. However, if the image on the sample is much more than 3/4" in the longitudinal dimension, the sensitivity of the instrument is decidedly reduced. That is to say, it is possible to detect much smaller differences in finish when the image on the paper is 3/8" long than when it is 3/4" long, other things being equal. When the image exceeds an inch in length the instrument is no more sensitive to finish differences than the unaided eye.

The lateral dimension of the light on the paper does not in general have to be limited as in the case of the longitudinal dimension. Too broad an image introduces optical difficulties in imaging the reflection on the prism. On the other hand, a fairly broad image is desirable so as to permit the finish measurement to be made over a considerable area of the paper, thus obtaining a more representative measurement than would result from a very small spot. An image on the paper approximately 1" in lateral dimension is very satisfactory.

At the low angle of incidence employed, differences in the color of the paper practically disappear so that it is easy to determine the finish of papers of widely different color. However, due to more or less refraction of the light by the surface of the paper, there are slight differences in the color of the reflected light coming from the paper. Paper having a smoother surface is likely to show a bluish shade on this account, and paper having a rougher surface is likely to have a reddish shade. To overcome these minor differences, the green filter 17 is introduced into the eyepiece as an additional refinement to aid in matching the fields.

The instrument is more sensitive in determining paper finish than any other means of which I am aware. It provides a means of quantitatively measuring finish on paper, has a broad range and high sensitivity.

The following values obtained with the instrument show its range and sensitivity:—

|  | Scale reading |
|---|---|
| Mimeograph paper | 12.5 |
| Bond | 26.0 |
| Dull finish coated paper | 35.5 |
| Super calendered book | 40.0 |
| Enamelled book | 50.2 |
| High-finish double coated paper | 64.8 |
| Microscope slide | 86.3 |

Check readings within .2 can be easily made by the same observer, and within .3 by different observers.

Although I have shown a photometer of the optical wedge type, it will be understood that the invention is not limited to this particular kind but that any form of photometer may be used.

It will be seen that the invention comprises broadly an apparatus in which a beam of light falls upon the sample of paper to be tested at a low angle of incidence, less than 20° and preferably 8–10°, to produce an image upon the paper less than approximately one inch in the longitudinal dimension and which measures the intensity of the light specularly reflected from the paper.

I claim:

1. Apparatus for determining finish on paper comprising supporting means for a sheet of paper to be tested, means for directing a beam of light onto the paper at an angle of incidence less than 20° to illuminate an area less than one inch in longitudinal dimension, an eyepiece, means for imaging the beam of light reflected from the paper on said eyepiece, a photometer, means for directing a comparison beam of light through said photometer and means for imaging the comparison beam of light on said eyepiece.

2. Apparatus as claimed in claim 1 wherein the means directing the beam of light onto the paper is such that the angle of incidence of said beam of light is approximately 8–10°.

3. Apparatus as claimed in claim 1 with means for imaging the comparison beam of light and the reflected beam on the eyepiece as semicircles having a common center line.

4. Apparatus as claimed in claim 1 wherein the photometer is of the optical wedge type.

5. Apparatus for determining finish on paper comprising an opaque housing containing means for supporting a sheet of paper in a plane, a source of light, an opaque screen between the source of light and said supporting means, provided with an aperture permitting light from said source to fall upon the paper, said aperture being of such size and so positioned with respect to said source of light and said paper that the beam of light passing therethrough falls upon the paper at an angle of incidence less than 20° and illuminates an area less than about one inch in longitudinal dimension, said screen having a second aperture permitting a comparison beam of light to pass therethrough, an eyepiece, means for imaging said comparison beam of light and the beam of light reflected from the paper on the eyepiece and a photometer in the path of said comparison beam of light.

6. Apparatus as claimed in claim 5 wherein the photometer is of the optical wedge type.

7. Apparatus as claimed in claim 5 with means for imaging the comparison beam of light and the reflected beam of light on the eyepiece as semicircles having a common center line.

8. Apparatus as claimed in claim 5 wherein the eyepiece contains a colored screen through which the images may be viewed.

9. Apparatus as claimed in claim 5 wherein the beam of light passing through the first mentioned aperture in the screen is directed onto the paper at an angle of incidence of approximately 8–10°.

10. Apparatus for determining finish on paper comprising supporting means for a sheet of paper to be tested, means for directing a beam of light onto the paper at an angle of incidence less than 20° to illuminate an area less than one inch in longitudinal dimension and means for measuring the intensity of the specularly reflected beam.

In testimony whereof, I affix my signature.

CHARLES H. MILLIGAN.